United States Patent Office 3,088,982
Patented May 7, 1963

3,088,982
GLYCOL PURIFICATION
Julian Feldman, Bernard A. Saffer, and Edwin A. Allgeier, Cincinnati, Ohio, assignors to National Distillers and Chemical Corporation, New York, N.Y., a corporation of Virginia
No Drawing. Filed May 16, 1960, Ser. No. 29,141
5 Claims. (Cl. 260—637)

This invention relates broadly to a method for the purification of crude glycols and, more particularly, to a novel and highly effective means for the purification of crude, isomeric mixtures of aliphatic $C_6$–$C_{16}$ glycols.

It is an object of this invention to provide a novel, economical, and practical process for the production of substantially pure aliphatic glycols. It is another object of this invention to separate substantially pure isomeric mixtures of glycols from mixtures containing them and non-glycollic substances distilling in approximately the same range as the glycols. Additional objects of the invention will become apparent from the following description.

It is known that an aliphatic conjugated diolefin can be treated with finely dispersed alkali metal in a reaction medium and, preferably, in the presence of a relatively small amount of a polycyclic aromatic hydrocarbon and/or in the presence of a selected solid, friable attrition agent at a temperature preferably below about 0° C. to produce a mixture comprised predominantly of dimetallic derivatives of the dimerized olefins. This dimetallo product mixture is then treated under selective reaction conditions with a reactant capable of reaction with the dimetallo dimers, such as, for example, oxygen, formaldehyde, ethylene oxide, and the like, to yield alkali metal salts of the corresponding unsaturated glycols. These salts are then treated with water or an alcohol such as methanol or ethanol to destroy any unreacted dialkali metal and to liberate the unsaturated glycols from their alkali metal derivatives which are initially formed. The mixtures of isomeric glycols are isolated from this reaction mixture by extraction, distillation, or other suitable means. The glycol product, the preparation of which is described in detail in, for example, U.S. Patents 2,850,538, 2,850,539, and 2,850,540, may subsequently be hydrogenated, thereby giving mixtures of crude saturated glycols comprising both straight chain and branched chain components.

Depending upon the reactants employed, a wide variety of glycol mixtures may be obtained. For example, where the initial reactants are butadiene and sodium and the glycols are prepared by using ethylene oxide, there results a mixture of $C_{12}$ glycols; with formaldehyde, there results a mixture of $C_{10}$ glycols. When other diolefins are used for the initial reaction, such as isoprene, dimethylbutadiene, the pentadienes, and the like, the final product will vary accordingly.

In addition to its straight chain and branched chain components, such a crude glycol mixture generally also contains impurities such as residual hydrogenation catalyst; alcohols; polymeric glycols and alcohols; hydrocarbons; and the like. The solid impurities may be removed by filtering or by centrifuging the crude mixture of glycols. Distillation of the crude mixture of glycols before hydrogenation, after hydrogenation, or both before and after hydrogenation serves to remove most of the lower boiling hydrocarbons, alcohols, and polymeric impurities. There remain, however, some higher aliphatic alcohols particularly the alkanols (such as decanols and tetradecanols) and other non-glycollic substances (such as polybutadiene) which boil in approximately the range of the isomeric glycol mixture. It is important that these contaminants be removed, because their presence would interfere with the application of the glycols. For example, if the contaminants were monofunctional compounds such as alcohols, they would hinder the conversion of the glycols to polyesters or other polymer systems. Since, however, some of these contaminants boil in approximately the same range that the glycol mixtures do and hence are not removable by distillation, it has been difficult to separate them from the glycols by conventional means.

A novel and practical process has now been found which will effectively separate these contaminating higher aliphatic alcohols and other non-glycollic material from isomeric glycol mixtures such as those prepared in the aforesaid manner. The process is based upon the unexpected discovery that such an effective separation may be brought about by a selective liquid-liquid extraction procedure, for example, with a non-polar non-aromatic hydrocarbon from a solution of the crude glycol mixture in certain strongly polar or aqueous-polar liquid media or in certain mixtures of polar solvents, to be defined more fully hereinafter.

It has now been found that in a two-solvent system comprising essentially a pair of substantially immiscible solvents one of which is of much higher polarity than the other, a mixture of higher alcohols and their corresponding glycols will be distributed in such a manner that the alcohols will concentrate in the less polar solvent and the glycols will concentrate in the more polar solvent. By utilizing the selected solvent pairs of this invention, this distribution is unexpectedly improved and practical separation of the glycols from the contaminating alcohols may be achieved in relatively few stages. It was discovered that the polar solvent portion of the solvent pairs of this invention was suitably a compound such as, for example, aqueous acetonitrile containing up to about 30 percent of water; a formamide-acetonitrile mixture containing up to about 30 percent of acetonitrile and which may also contain up to about 5 percent of water; or the like, a 70 percent acetonitrile/30 percent water mixture being preferred. When an acetonitrile mixture is employed, the glycols may be recovered simply therefrom by evaporation of the solvent or by distillation.

Formamide is an especially effective solvent, but it is less useful alone than in acetonitrile mixtures because of the limited solubility of the glycols therein (about 5 percent) and because of its relatively great instability which makes recovery of the glycols by distillation more difficult than from mixtures containing acetonitrile. Thus in order to separate glycols from a formamide solution thereof, a further step is required, such as (1) the addition of water to the formamide solution or (2) the use of a second solvent such as chloroform, methyl isobutyl ketone, butanol, ether, benzene, or the like, and then evaporating to remove said solvent.

The non-polar portion of the solvent pairs of this invention may be any liquid non-aromatic hydrocarbon of suitable volatility which is substantially immiscible with the aforedescribed polar liquid medium, such as, for example, saturated aliphatic or alicyclic hydrocarbons having up to about 12 carbon atoms. Illustrative of these are hexane, heptane, octane, cyclohexane, alkylate, and the like, and mixtures of these.

In accordance with this invention, the starting mixture of crude isomeric glycols, such as a mixture obtained by the aforedescribed process, is subjected to a liquid-liquid extraction treatment with a suitable selected polar solvent under conditions to dissolve the glycol mixture and with a suitable nonpolar hydrocarbon to remove selectively the non-glycollic impurities. More specifically, the process embodied herein comprises contacting the crude isomeric mixture of glycols with a suitable polar solvent, an example of which is a 70/30 mixture of acetonitrile and water, at a temperature in the general range of about 0° to about 100° C. to dissolve all or substantially all of the isomeric glycol mixture and with a suitable aliphatic hydrocarbon, such as, for example, hexane, which will selectively dissolve the non-glycollic contaminants.

Either batchwise, concurrent, or batch-continuous concurrent or countercurrent operation is permissible for the process of this invention. The exact manner is not critical provided that the crude glycol or glycol mixture being purified is brought into intimate contact with both of the solvents. The amount of solvent used is a function of the number of stages and the required ultimate purity. It is determined also by whether the operation is countercurrent or concurrent. For example, in batchwise concurrent operation at least 8 volumes of non-polar solvent, and preferably about 30 volumes, are required for 1 part of crude glycol or glycol mixture when 10 or more stages are used. In a batch-continuous system, however, where the non-polar solvent is continuously stripped from the extract to recycle to the batch extracter, much less solvent, e.g., about 3 volumes per part of crude glycol, is needed. In countercurrent operation at least 12, and preferably about 20, volumes of non-polar solvent are required for 1 part of crude glycol or crude glycol mixture undergoing purification when 15 stages are employed. Here the ratio of light (non-polar) to heavy (polar) phase is critical and should be at least 2.

The amount of polar solvent required likewise varies, depending upon the mode of extraction and the particular solvent system employed. For example, about 4 to 10 volumes of a 70/30 acetonitrile/water mixture, about 8 to 20 volumes of a 30/70 acetonitrile/formamide mixture, or about 10 to 30 volumes of a 70/26/4 formamide/acetonitrile/water system per part of crude glycol or glycol mixture may be used satisfactorily.

The temperature at which the purification process of this invention takes place is not critical, the temperature depending upon the mode of extraction and the particular solvents selected. It should, however, be below the temperature at which the two solvents become miscible. Generally, for convenience, the temperature is in the range of about 0° to 100° C., and preferably in the range of about 20° to about 60° C.

Although the present invention will be illustrated primarily with regard to the purification of a crude isomeric mixture of aliphatic, saturated $C_{12}$ glycols, it is not intended to be limited thereto. This invention is equally applicable to the purification of any mixture of aliphatic saturated or unsaturated straight chain and branched chain $C_6$ to $C_{16}$ glycols, of aliphatic saturated or unsaturated straight chain $C_6$ to $C_{16}$ glycols, and of any mixture of aliphatic saturated or unsaturated branched chain $C_6$ to $C_{16}$ glycols.

In order to illustrate the invention, but without intent of limitation, the following specific embodiments are set forth.

EXAMPLES

Disodiooctadiene was prepared from 3.0 moles of butadiene and 3.0 grams atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of about 1 to 2 percent of terphenyl. A temperature of about −23° C. was used. About 1.2 moles of disodiooctadiene resulted from this reaction. When this initial reaction was complete, 3.0 moles of gaseous ethylene oxide were admitted to the mixture over a two-hour period while maintaining a reaction temperature of about −30° C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. A mixture of 297 parts of the unsaturated $C_{12}$ glycols and 350 parts of methanol was hydrogenated in a pressure vessel at 300 p.s.i.g. over nickel catalyst. The resulting saturated $C_{12}$ glycols, comprising the straight chain glycol 1,12-dodecanediol and the branched chain glycols 3,6-diethyl-1,8-octanediol and 3-ethyl-1,10-decanediol were then washed from the reactor with 200 parts of methanol, and the mixture was filtered to remove the catalyst. After removal of the methanol and water, 239 parts of the isomeric mixture of glycols were obtained.

Samples of this crude, isomeric mixture of aliphatic, saturated $C_{12}$ glycols from which most of the linear component had been removed by crystallization were purified by concurrent and by countercurrent liquid-liquid extraction procedures. In those examples were acetonitrile was the polar phase, the solvent was removed by distillation. Where formamide was the polar phase, the glycol was recovered by extraction with chloroform in three stages.

Concurrent extraction, using fresh solvent at each stage, was employed for Examples 1 to 3 and Example 6. For Examples 4 and 5 countercurrent extraction in a 1″ York-Scheibel continuous extraction column having 22 alternate mixing and settling zones was used. The polar solvent was metered into the top of the column, the non-polar solvent was metered into the bottom of the column at such a rate as to give the proper ratio of phases, and the crude glycol mixture was added to the fifth stage from the top by means of a bellows pump. The raffinate layers were distilled through a column to remove the acetonitrile azeotrope. The residual glycol layers were separated from the water and distilled at 127–145° C. at 0.2 mm. The unexpectedly superior effectiveness of the particular polar solvent systems of this invention may be noted by comparing the results of Examples 1 through 5, i.e., with respect to raffinate yield and OH content and to extract yield and OH content, with the results obtained in Example 6 where acetonitrile alone was used as the polar solvent.

Table I

| Example | 1 | 2 | 3 | 4 | 5 | 6 |
|---|---|---|---|---|---|---|
| Polar Solvent | (a) | (b) | (c) | (a) | (a) | (d) |
| Non-polar Solvent | hexane | hexane | octane | octane | hexane | hexane |
| Ratio of Polar to Non-polar Solvents | 2 | 2 | 2 | 2 | 0.34 | 2 |
| Glycol Concn., percent | 12 | 12 | 15 | 12.5 | 25 | 15 |
| OH content, percent | 15.1 | 15.3 | 15.3 | 15.1 | 14.7 | 13.2 |
| No. of Extractions | 5 | 10 | 5 | 15 | 15 | 10 |
| Temp., ° C | 42 | 25 | 60 | 42 | 40 | 25 |
| Raffinate Yield, percent | 85.8 | 91.5 | 84.1 | 96 | 85.8 | 77.6 |
| OH content e, percent | 16.0 | 16.0 | 16.5 | f 15.8 | f 16.6 | 14.6 |
| Extract Yield, percent | 10.4 | 8.5 | 7.7 | 3.9 | 14.2 | 20.5 |
| OH content e, percent | 8.9 | 6.8 | 10.8 | 3.6 | 8.6 | 6.7 | a 70% acetonitrile/30% water.
b 86% acetonitrile/14% water.
c 26% acetonitrile/70% formamide/4% water.
d 100% acetonitrile.
e Solvent-free basis.
f After evaporation of solvent, residual glycol was distilled from a Claisen flask in vacuo.

Examples 7 to 18 show the distribution coefficients for lauryl alcohol and for a mixture of branched chain $C_{12}$ glycols in various solvent pairs. Runs 13 to 18 were carried out with solvent pairs other than those of the present invention and have been included to demonstrate the marked improvement in distribution coefficients obtained by using the solvent pairs as embodied herein. The distribution coefficient, $k$, was determined for lauryl alcohol in several solvent systems in initial concentrations of one and five percent in the polar phase. Analysis was made gravimetrically by evaporation of the solvents. The mixture of branched chain $C_{12}$ glycols was separated from most of the linear 1,12-dodecanediol by crystallization from acetone at 10° C. Portions of the $C_{12}$ glycol mixture were dissolved in 5 percent concentration in various polar solvents and equilibrated with equal volumes of non-polar solvent. The solvents were evaporated to give the weights of raffinate and extract from which the distribution coefficient, $k$, was determined.

$$k = \frac{\text{concentration in non-polar extract}}{\text{concentration in polar raffinate}}$$

nitrile containing up to about 30 percent of acetonitrile, and an aqueous mixture of formamide and acetonitrile containing up to about 70 percent of formamide and up to about 5 percent of water with a non-polar, immiscible liquid saturated aliphatic hydrocarbon medium which is a solvent for the non-glycollic materials at a temperature between about 0° and 100° C., whereby the non-glycollic materials are extracted to provide an extract phase of the

Table II

| Example | Solvent System | | Temp., °C. | Concn. of Component,[1] Volume Percent | Distribution Coefficient, $k$ | |
|---|---|---|---|---|---|---|
| | Polar Phase | Non-polar phase | | | Alcohol | Glycol |
| 7 | Acetonitrile 86%/Water 14% | Hexane | 25 | 1 | 1.90 | |
| 8 | ___do___ | ___do___ | 25 | 5 | | .007 |
| 9 | Acetonitrile 70%/Water 30% | ___do___ | 25 | 1 | 9.2 | |
| 10 | ___do___ | ___do___ | 25 | 5 | | .006 |
| 11 | Acetonitrile 30%/Formamide 70%. | Octane | 60 | 1 | 3.2 | |
| 12 | ___do___ | ___do___ | 60 | 5 | 8.5 | .02 |
| 13 | Acetonitrile | Hexane | 25 | 1 | .086 | |
| 14 | ___do___ | ___do___ | 25 | 5 | 1.36 | .014 |
| 15 | Formamide | ___do___[2] | 25 | 5 | 20.1 | .007 |
| 16 | ___do___ | Carbon tetrachloride. | 25 | 5 | 26 | .10 |
| 17 | Glycerol 90%/Water 10% | Hexane[2] | 25 | 5 | 22 | ([3]) |
| 18 | Glycerol 80%/Methanol 20% | Toluene | 25 | 5 | | 1.0 |

[1] Inital solution of component in polar phase.
[2] Octane used for glycol experiment.
[3] A third liquid phase appeared.

While there are above disclosed but a limited number of embodiments of the process of the invention herein presented, it is possible to produce still other embodiments without departing from the inventive concept herein disclosed. It is desired, therefore, that only such limitations be imposed on the appended claims as are stated therein.

What is claimed is:

1. A liquid-liquid extraction process for the separation and recovery of substantially pure isomeric aliphatic glycols having 6 to 16 carbon atoms between the hydroxyl groups from a mixture containing said glycols and non-glycollic materials of relatively close boiling points consisting of alkanols and polyalkadienes which includes the the steps of extracting a solution of the crude isomeric glycol mixture dissolved in a polar liquid medium selected from the group consisting of aqueous acetonitrile containing up to about 30 percent of water, a mixture of formamide and acetonitrile containing up to about 30 percent of acetonitrile, and an aqueous mixture of formamide and acetonitrile containing up to about 70 percent of formamide and up to about 5 percent of water with a non-polar, immiscible liquid saturated aliphatic hydrocarbon medium at a temperature between about 0° and 100° C., whereby the non-glycollic materials are extracted to provide an extract phase of the non-glycollic materials and a raffinate phase of said glycols, and recovering the glycols from said polar liquid medium.

2. A liquid-liquid extraction process for the separation and recovery of an isomeric mixture of saturated, aliphatic $C_{12}$ glycols, said mixture consisting of 1,12-dodecanediol, 3,6-diethyl-1,8-octanediol, and 3-ethyl-1,10-decanediol, from non-glycollic materials of relatively close boiling points, said non-glycollic materials cosisting of alkanols and polyalkadienes, which comprises the steps of contacting a solution of the glycols and non-glycollic materials in a polar liquid medium selected from the group consisting of aqueous acetonitrile containing up to about 30 percent of water, a mixture of formamide and aceto- nitrile containing up to about 30 percent of acetonitrile, and an aqueous mixture of formamide and acetonitrile containing up to about 70 percent of formamide and up to about 5 percent of water with a non-polar, immiscible liquid saturated aliphatic hydrocarbon medium which is a solvent for the non-glycollic materials at a temperature between about 0° and 100° C., whereby the non-glycollic materials are extracted to provide an extract phase of the non-glycollic materials and a raffinate phase of said glycols, and recovering a substantially pure isomeric mixture of saturated, aliphatic $C_{12}$ glycols from the raffinate.

3. The method of claim 2 wherein the polar medium is aqueous acetonitrile containing up to about 30 percent of water and the non-polar medium is hexane.

4. A liquid-liquid extraction process for the separation and recovery of a mixture of saturated, aliphatic, branched chain $C_{12}$ glycols, said mixture consisting of 3,6-diethyl-1,8-octanediol and 3-ethyl-1,10-decanediol, from a mixture containing said glycols and non-glycollic materials of relatively close boiling points, said non-glycollic materials consisting of alkanols and polyalkadienes, which comprises the steps of contacting a solution of the glycols and non-glycollic materials in a polar liquid medium selected from the group consisting of aqueous acetonitrile containing up to about 30 percent of water, a mixture of formamide and acetonitrile containing up to about 30 percent of acetonitrile, and an aqueous mixture of formamide and acetonitrile containing up to about 70 percent of formamide and up to about 5 percent of water with a non-polar, immiscible liquid saturated aliphatic hydrocarbon medium at a temperature between about 0° and 100° C., whereby the non-glycollic materials are extracted to provide an extract phase of the non-glycollic materials and a raffinate phase of the glycols, and recovering said glycols from the raffinate.

5. The method of claim 4 wherein the polar medium is an aqueous mixture of formamide and acetonitrile containing up to about 70 percent of formamide and up to about 5 percent of water and the non-polar medium is octane.

References Cited in the file of this patent

UNITED STATES PATENTS 2,436,209     Elgin _____ Feb. 17, 1948
2,691,048     Francis _____ Oct. 5, 1954